INVENTOR
Henri Georges de France
BY
Bailey, Stephens & Huettig
ATTORNEYS

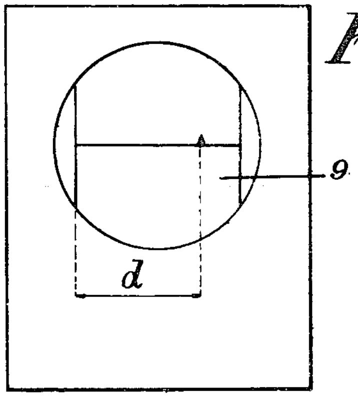
Fig. 4.
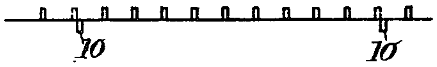
Fig. 5.
Fig. 6. Fig. 7.
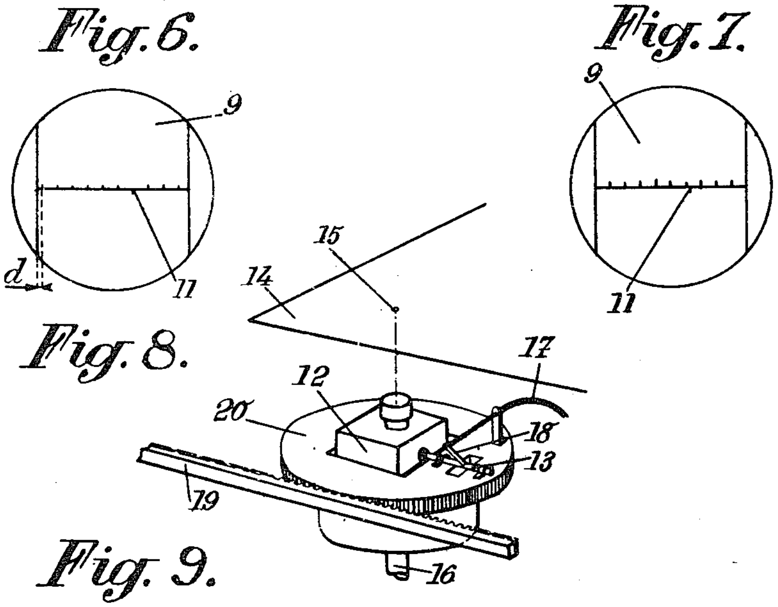
Fig. 6, Fig. 7, Fig. 8.
Fig. 9.
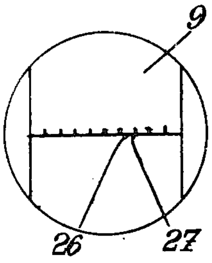
Fig. 10.
INVENTOR
HENRI GEORGES DEFRANCE
BY Bailey, Stephens & Huettig
ATTORNEYS INVENTOR
Henri Georges de France
BY Bailey, Stephens & Huettig
ATTORNEYS April 28, 1953

H. G. DE FRANCE

COMMUNICATION SYSTEM BETWEEN TWO STATIONS LINKED BY TELEVISION 2,637,022

Filed Nov. 4, 1947

4 Sheets-Sheet 4

INVENTOR
HENRI GEORGES DE FRANCE
BY
Bailey, Stephens & Huettig
ATTORNEYS

Patented Apr. 28, 1953

2,637,022

UNITED STATES PATENT OFFICE 2,637,022

COMMUNICATION SYSTEM BETWEEN TWO STATIONS LINKED BY TELEVISION

Henri Georges de France, Paris, France, assignor to La Radio Industrie S. A., Paris, France, a society of France Application November 4, 1947, Serial No. 783,918
In France January 16, 1947

12 Claims. (Cl. 343—6)

The invention relates to communication systems between two stations linked by television, one of these stations being fixed, the other being located on a movable machine on which the transmission cameras are fitted.

It is of current practice, in such a case, to provide synchronism generators in the vicinity of the fixed station and to send to the station on the movable machine synchronizing signals which are retransmitted by said movable station together with the video modulation, to determine correct operation of the receiver provided at the fixed station.

The chief object of the present invention is to provide a system of this kind which is better adapted to meet the requirements of practice than those used for similar purposes up to this time.

Preferred embodiments of the present invention will be hereinafter described, with reference to the accompanying drawings, given merely by way of example, and in which—

Fig. 1 diagrammatically illustrates the operation of a system according to the present invention, Fig. 2 is a diagram showing the various elements of a television transmission system according to Fig. 1;

Fig. 3 illustrates a geometric method of localizing the movable station;

Figs. 4, 6 and 7 diagrammatically show the screens of the cathode ray tubes included in analysis and measurement apparatus of the system according to the present invention;

Fig. 5 diagrammatically shows the form of the sequence of line synchronizing signals of a television equipment made according to the present invention;

Fig. 8 shows, in perspective view, a transfer device used in connection with this equipment;

Fig. 9 shows the shape of the line synchronizing signals of a television equipment made according to another feature of the invention;

Fig. 10 shows the screen of a cathode ray tube of an analysis apparatus for use according to still another feature of the invention;

Figure 1:
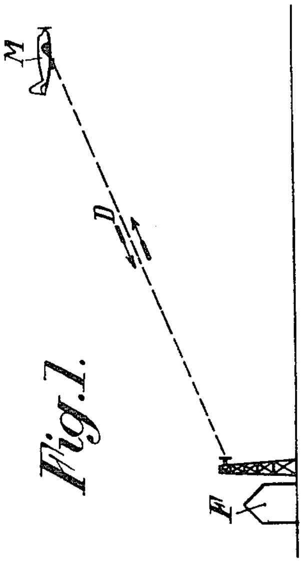
Figure 2:
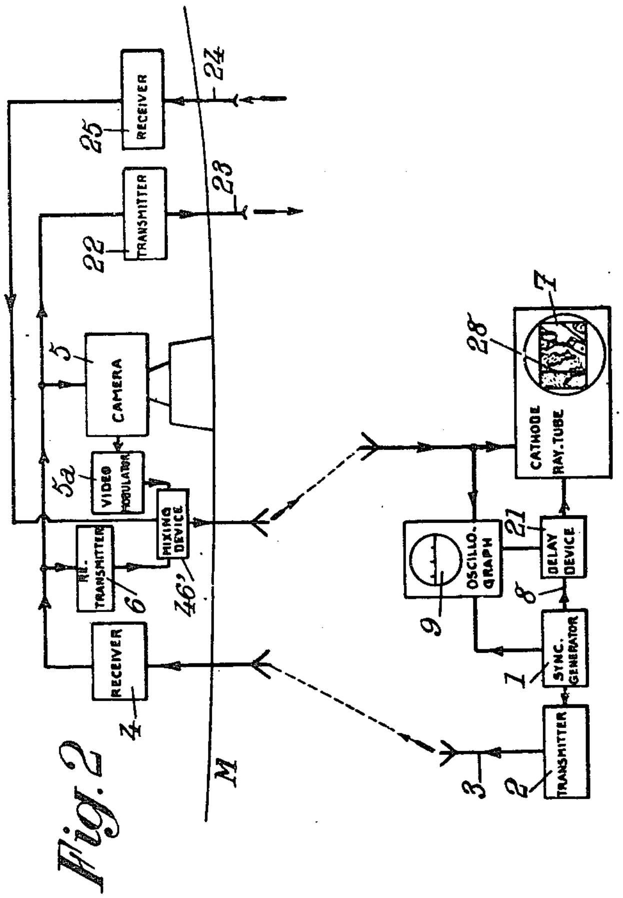

According to the present invention, in order to determine the distance between a fixed station F and a movable machine M, for instance an aircraft, provided with a television camera so that it is possible, at the fixed station, to observe the field of said camera, I proceed as follows:

I provide (Figs. 1, 2) according to the usual practice in such a case, close to the receiver of the fixed station F, the line and frame synchronizing signals generators 1, and I send, through transmitter 2 (for instance, of the type including a grid modulated triode as described in pages 7–66, Fig. 48, of the handbook "Principles of Radar of Staff of M. I. T.," second edition, first printing, 1946) and aerial 3, the signals from said generator toward a receiver 4 on board of the aircraft to determine correct scanning of the iconoscope of camera 5 carried by said aircraft. These signals are retransmitted by the transmitter 6 (of the kind of biased multivibrators, for instance, such as described in the handbook "Pulse Generators" (McGraw-Hill), M. I. T. Radiation Lab. Series) of the aircraft, simultaneously with the video modulation transmitted by transmitter 5a (the whole being mixed in a suitable device 46), so as to ensure synchronization of scanning in the observation cathode ray tube 7, which belongs to the fixed receiver equipment. It should be noted that retransmission of the frame synchronizing signals by the movable station may be dispensed with when the distance between the two stations is lower than a given maximum averaging 150 km. In this case I make use, at the receiver station, of the frame synchronizing pulses directly transmitted through line 8 from the adjacent generator 1, the time lead of these pulses remaining within admissible limits.

In such a case, only the line synchronizing signals are transmitted to the movable station and retransmitted therefrom.

According to my invention, these signals are used in the same way as the pulses of a "radar" system to determine the distance between the two stations with however this difference that, in the present case, the pulses are received and then retransmitted from the movable station instead of being merely reflected from the machine that carries said station.

If it is supposed, for instance, that I use a television equipment with a 1000 lines and 25 half-frames per second analysis, for which equipment synchronization is ensured by derivation of the front or rear parts of sharp edge rectangular signals, the line signals already supply impulses at a repetition frequency of 25,000 per second.

To this impulse generator 1 is associated a cathode ray tube analyzer 9 of the kind used in existing "radar" systems, in which analyzer horizontal scanning is triggered off by the outgoing signals, as they are transmitted, at the frequency of, for instance 25,000 per second, and the return signals determine a vertical deflection of the spot. It is then possible to observe the return signal on the screen of tube 9 (Fig. 4), and the distance $d$ from said return signal to the vertical starting edge of the horizontal scanning (left hand edge for instance) corresponds to the distance of machine M from station F, account being taken of the time necessary at the movable station to receive the signal and to retransmit it.

But the available frequency of repetition, to wit 25,000 impulses per second, limits the range to 6 km. (12 km. for the round trip). This is due to the fact that, at this range, every return signal is lagging by $\frac{1}{25.000}$ of a second with respect to the transmitted signal, and is therefore superposed to the next signal; for greater distances, every return signal can be observed on the screen, but the apparatus does not indicate the number $n$ of impulses that have been transmitted since the transmission of the corresponding outgoing signal.

In order to obtain this indication, I may have recourse to another localization method which is not so precise as the preceding one, for instance a goniometric one, since the distance D in kilometres is already known by a formula of the type:

$$D=6n+d_0$$

in which $d_0$ is the distance in kilometres (lower than 6) corresponding to the distance $d$ on screen 9 and $n$ is the number of interposed impulses as above defined.

But preferably I make use of a feature of my invention according to which a repetition frequency lower than 25,000 is introduced by particularizing or differentiating some of the signals transmitted at this frequency.

Thus, supposing that the aircraft is to fly within a radius of 60 km. about the fixed station, every tenth line impulse is particularized, so as to create a system of impulses the repetition frequency of which is 2,500; the returning signals are analyzed, as in the preceding case, distance $d$ representing in this case a fraction of 60 km. instead of a fraction of 6 km. This appreciation can be made more accurate by comparing the value thus obtained with that given by the above formula which itself results from an analysis with all the signals.

Although particularization of the signals may be applied to any of their characteristics (height, length, etc.), provided that the sharp edge that is used for synchronization purposes, for instance the rear edge, be kept intact, it seems advantageous to act on the sign of the signals. For instance every tenth deflection constitutes a negative pulse, instead of a positive one, as each of the others. Of course, if synchronization is performed by derivation of the downward rear edge of the signal, as above indicated, the signals so particularized must be caused to lag by a time equal to the duration of the pulse, the active downward edge being in this case the front edge. Illustration of a sequence of line synchronization signals in a system thus established is given by Fig. 5 where the particularized signals are designated by 10.

It seems advantageous with such an arrangement, to cause both of the systems of return signals to appear on a single screen 9 (Fig. 6), the tube being swept horizontally at the frequency repetition of the particularized signals. Ten return pulses are visible on this screen, one of them, 11, being the particularized pulse.

This permits of determining the above defined number $n$ of impulses and also the distance $d_0$ that corresponds to the distance $d$ from the edge to the first image on screen 9. It is therefore possible to read the desired distance; in this case 38 km.

It seems still more advantageous (Fig. 7), in particular when there are several movable stations, to show on the screen only the particularized pulse, together with a scale constituted by deviations of the spot produced by all the outgoing synchronization signals, the divisions of said scale corresponding each to 6 km. in the above considered example. Horizontal scanning is triggered by transmission of the particularized pulses; the distance that is read in this case is still 38 km.

According to another feature of my invention, I associate with the above device, capable of determining the distance of the movable station from the fixed station, means for localizing said movable station with respect to said fixed station.

Thus, in order first to determine its azimuth, I may have recourse to one of the existing localizing systems, for instance a goniometric system, advantageously arranged in such manner as automatically to follow the movable machine in direction and thus to supply, at any time, on a graduated circle, the indication of the azimuth. But I preferably utilize, in combination with the television equipment itself, and more particularly in connection with the means for producing the electro-magnetic line pulses, a directional aerial system with a single lobe or with two divergent lobes, of the kind used in "radar" systems and arranged in such manner as automatically to follow the direction of the machine.

Figure 3:
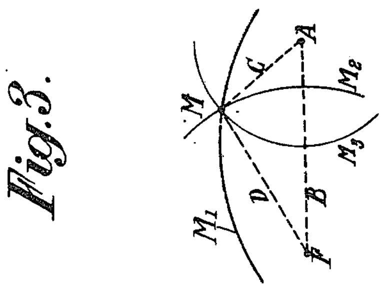

I may also, according to another feature of my invention, make use of a second fixed receiver station A, located at a distance B from the first one F (Fig. 3). This station A receives the pulses retransmitted from movable station M, after the pulses coming directly from station F. The distance R corresponding to this time lag permits of locating the mobile station on a first geometrical locus M1: an ellipse the foci of which are stations F and A since:

$$D+C=B+R$$

(D and C being the distances from the movable station to fixed stations F and A, respectively). A second locus M2 would be the circle having its center at fixed station F and a radius equal to D. A third locus M3 would be a circle having its center at auxiliary station A and the radius of which would be equal to C $$(C=B+R-D)$$

In the particular case of aircraft, there remains to determine the altitude. I make use for instance, in addition to the preceding devices, of an aerial having directional characteristics in the vertical plane. Preferably, I employ an aerial with a conical directivity diagram capable of indicating both the azimuth and the angle with the horizontal plane in a single operation. These two values, combined to those of the distance, permit of fully locating the movable station in space with respect to the fixed station.

According to another feature, I associate, with devices as those above described, for localizing the movable station, means for marking on a map the indications of these devices.

I have shown two embodiments of such a combination.

According to one of these embodiments I project on a map, preferably a transparent map and from behind with respect to an observer, a light beam issuing from a suitable source, which beam comes normally to form a spot, when no localization is to be, at the place of the map that represents the fixed station. And this beam is submitted, through suitable mechanical means, to a deviation bringing the spot on a point of the map which represents the position of the aircraft (or of its projection on the ground).

The light source 12 (Fig. 8) is given two rotation movements, about two rectangular axes intersecting each other on said source, one of these axes, 13, is parallel to the plane of map 14 and adapted to move the spot along a straight line passing through the point 15 which represents the fixed station. The other one, 16, is perpendicular to map 14 at this point 15 so as to mark the azimuth by determining the direction of said straight line. The first movement is for instance controlled by causing flexible cable transmission 17 to act upon an arm 18 keyed on axis 13 and the second one by causing rack 19 to act upon pinion 20 keyed on shaft 16.

Although these controls may be actuated by operators who follow azimuth and distance of the machine, however, preferably the marking of the azimuth is controlled by the localizing device. In this way, the marking is at least partly automatic.

According to the second of said embodiments localization is ensured by scanning by means of movable aerials providing on the screen of an analyzing tube a polar representation in which the moving aircraft appears as a point whose distance from the center of the screen corresponds to its distance from the fixed station, and I project on the transparent map an image of this map-screen, care being taken to ensure coincidence of the scales, of the points that represent the fixed point, and of the geographical directions, of these two maps.

According to still another feature, the time interval existing between the transmission and the return of a line pulse is used for imparting a corresponding lag to the frame pulses in their transmission between the synchronism generator 1 and the adjacent receiver 7 through line 8, to which a delay device 21 (an artificial line of the kind described in volume 19 of the M. I. T. Radiation Laboratory publications entitled "Waveforms," chapter 22, page 730 (see in particular Fig. 22-1)) is added.

Thus, to sum up, the observers at the fixed station dispose, in addition to the screens such as 7 of the television device proper, which supply images of the fields covered by the transmission cameras on board the moving aircraft, on the one hand of a map 14 on which they can note the positions of these machines, and on the other hand of auxiliary screens 9 indicating their distance, even indicating their angle of elevation and their azimuth separately, on suitable graduations.

According to still another feature of my invention, I modulate the signals that constitute the line pulses by means of signals capable of being detected, adapted to ensure suitable teletransmission between the two stations.

In the direction of the fixed station toward the movable station, such signals may serve to perform telecontrol or to signal to a crew certain operations to be performed on board this machine. In the opposed direction, other signals may transmit to the fixed station the indications of various apparatus on board the machine.

These modulations can be applied to any characteristic, for instance the height, the width or the position of the signals when reversing of the pulse direction is reserved to the measurement of distance. Representation of a sequence of synchronization signals serving to the measurement of distance and transmitting a modulation low frequency wave is given by Fig. 9.

Concerning the telecontrol from the fixed station of certain operations to be performed on board the aircraft, the receiver elements corresponding to the various controls are characterized by one or several different low frequencies the combination of which indicates the direction of the operation and its amplitude.

Concerning transmission to the fixed station of the indications of certain measurement apparatus, the synchronization signals retransmitted from the movable station are modulated both by a reference low frequency wave identical for all apparatus and by a second low frequency wave, which is a harmonic of the reference wave, the order of which harmonic identifies a given apparatus and the phase difference of which with the reference wave is controlled by the indication of the measurement apparatus.

To transmit the indications of the apparatus on the aircraft, I may also make use, according to another feature, of suitable optical means giving an image of the instruments board of said aircraft on a portion of the sensitive surface of the scanning iconoscope. I thus obtain at the receiver station a television image of the instrument board, which image can be amplified and projected separately on a screen.

According to still another feature of my invention, the aircraft altitude is determined by measuring the time interval that exists between the line synchronization signals directly retransmitted by this aircraft and the same signals retransmitted by this aircraft after they have been directed toward the ground and received after reflection therefrom.

Thus the aircraft is provided, in addition to its normal equipment, with a device adapted to receive the line pulses and to retransmit them together with the video modulation, said device including a transmitter 22 (similar to transmitter 2, the only difference being in the antenna; to send only every $n$th impulse ($n$ being for instance equal to 10) the modulator stage further includes a bias discriminator circuit called "clipper circuit" of the type shown by Fig. 9, page 227, of "Television Simplified" by Milton S. Kiver, Van Nostrand, publisher, second edition, fourth printing) which, associated with a directional aerial 23, is capable of transmitting, in a downward direction, particularized pulses (for instance those serving to determine the distance from fixed station to movable station, as above described).

After reflection from the earth (ground or sea) these pulses are received by the aerial 24 and the receiver 25 of said device and retransmitted with the video modulation, with a time delay corresponding to the travel movable station-earth and return.

On the screen of the cathode ray tube of a special analyzer, for instance that, 9, serving to the measurement of the distance, the return pulse supplies an image lagging with respect to that of the direct return pulse: the screen has the appearance of Fig. 10 according to one of the embodiments above described (Fig. 7). Horizontal scanning is started when the particularized pulse is transmitted. The direct return pulse is 26, indicating the distance (38 kms.) and the return pulse after measurement of the altitude is 27, the altitude being indicated by the interval between 26 and 27 (3 kms.), the scale being obtained as above indicated.

In the most frequent case where the aircraft is at an altitude lower than 6 kms., and the television plant has the above indicated characteristics, all the line pulses may be utilized for measurement of altitude, without introducing an indetermination. In these conditions, the pulses retransmitted with the video modulation by the movable station after reflection from the ground form, on the screen of the tube 7 of the vision receiving station, a vertical line 28 (Fig. 2) the distance of which from the left hand edge corresponds to the desired altitude. A similar line 28, but made of dots, is also obtained if only the particularized pulses are used. If it is not desired to measure the distance but merely the altitude, it is preferable to operate according to the second embodiment, making use of all the pulses, and solving the indetermination, when the aircraft is at an altitude higher than 6 kms., by an approximate measurement of this altitude according to one of the existing methods, for instance by having recourse, for transmission, to serials having a directivity in the vertical direction. Anyway this altitude is equal to a multiple of 6 kms. plus a fraction of 6 kms. represented by the distance from the left vertical edge of the image to the vertical line produced by the returning pulses.

Figure 11:
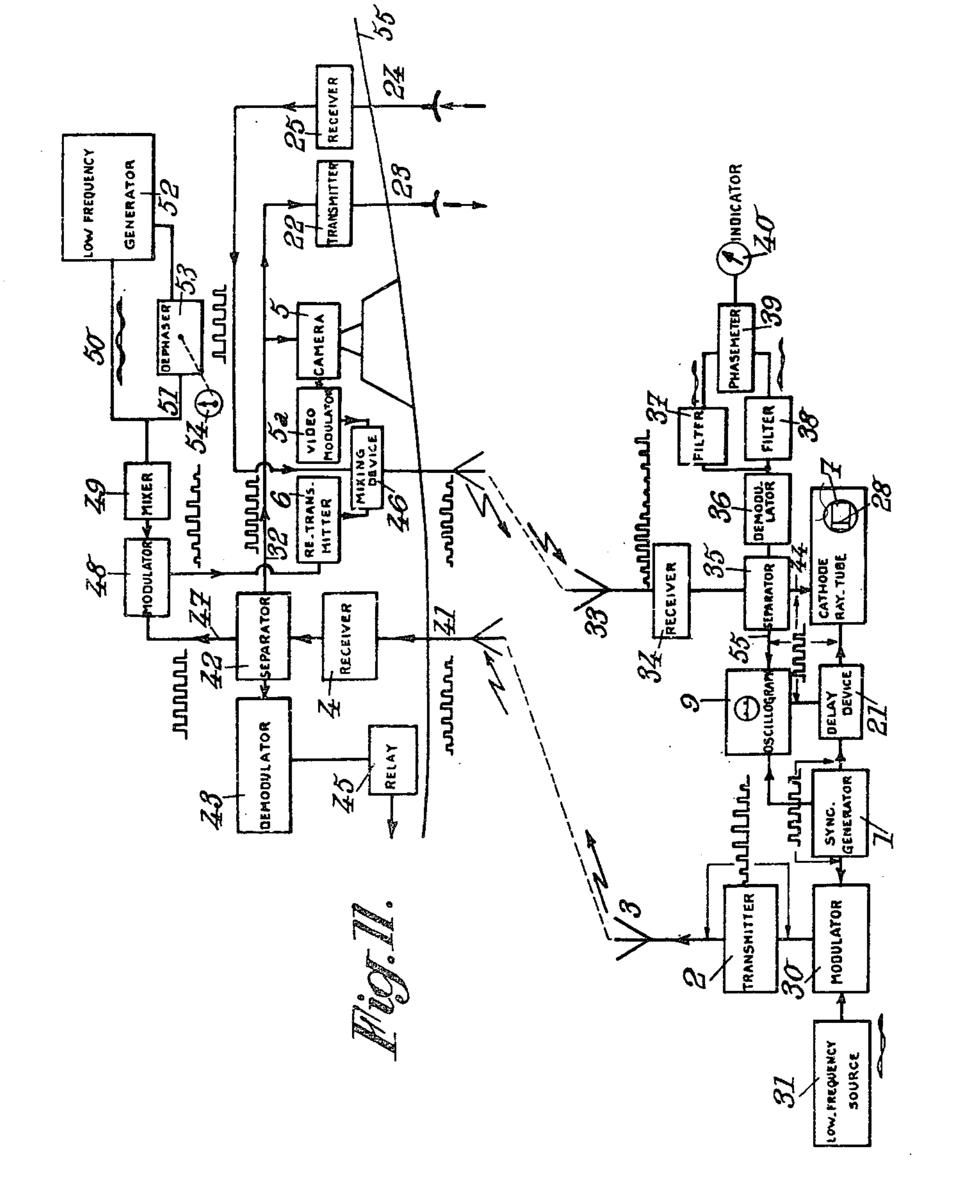
Fig. 11 is a wiring diagram of a system according to the invention.
Figure 12:
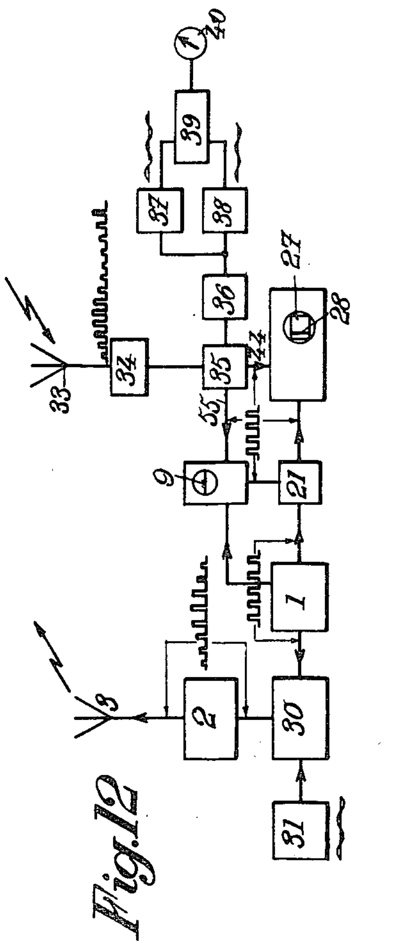
Figure 13:
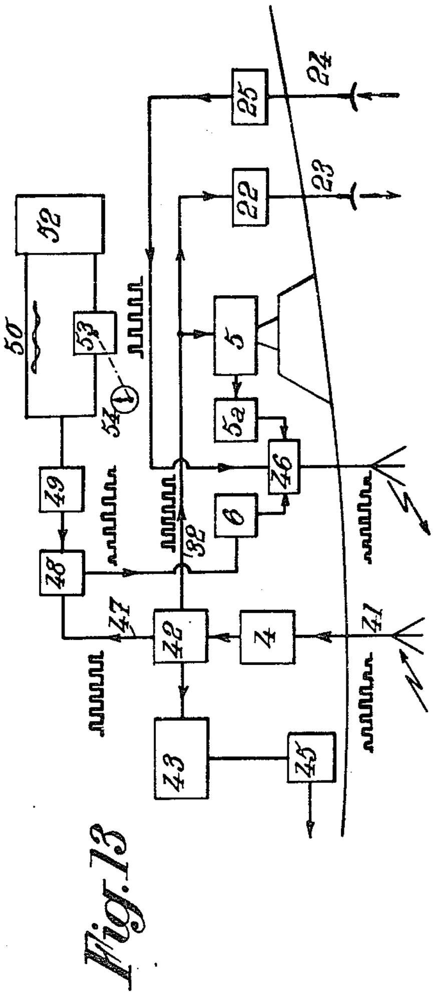

Fig. 11 is a wiring diagram of the system including a fixed station and a movable station (fitted on an aircraft) adapted to permit:

I. Television transmission;

II. Measurement of the distance from the fixed station to the aircraft;

III. Telecontrol from the fixed station of an apparatus on the aircraft;

IV. Transmission to the fixed station of the indication of an apparatus on the aircraft;

V. Measurement of the altitude of the aircraft.

This system is as follows:

A generator 1 transmits through 2—3, as above indicated, pulses modulated in modulator 30 fed from a low frequency source 31. These modulated pulses, received by antenna 41 and receiver 4 are separated at 42 to send, respectively:

*a*. Into line 32 the synchronization pulses to be fed to camera 5, for the usual purposes;

*b*. Into a line leading to demodulator 43 the telecontrol modulated pulses, so as to detect the low frequency corresponding to the modulation and to supply it to a local relay 45, which controls the apparatus to be telecontrolled, for instance through a servo-motor; and

*c*. Into a line 47 the pulses to be retransmitted toward the fixed station, these pulses being transformed by a modulator 48 which receives from a mixer 49 on the one hand through 50 a reference low frequency from a generator 52 and on the other hand through 51 a second low frequency which is a harmonic of said reference low frequency, line 51 including means 53 for introducing a phase lag variable in accordance with the indication, supplied by measurement apparatus 54, which is to be transmitted to the fixed station.

The pulses modulated in device 48 are sent to transmitter 6, 46.

At the fixed station these modulated pulses are received by antenna 33 and receiver 34 and sent to a separator 35 where they are separated to send, respectively:

*a'*. Synchronization pulses into line 44 leading to television receiver 7;

*b'*. Distance indicating pulses into line 55 leading to the oscillograph the screen of which is shown at 9 on Fig. 2;

*c'*. Pulses that retained the modulation to demodulator 36 which supplied the composite low frequency corresponding to this modulation to filters 37 and 38 which pass, respectively, the reference and the harmonic frequencies, a device 39 measuring the phase difference between these frequencies and transmitting the corresponding measurement to indicator 40. Separator 35 includes three stages in parallel, respectively connected to line 44, line 55 and demodulator 36, these three stages being as follows, in the order above stated:

I. The first is a diode clipper, as shown by Fig. 9.3 of page 227 of "Television Simplified," above mentioned, so as to transmit only the negative impulses (i. e. those more negative than the signal) such as pulses 10 of Fig. 9. The diode bias must be chosen to correspond to the level of the white portions of the picture. It separates the impulses for measurement of the distance from those for measurement of altitude.

II. The second element of separator 35 is an ordinary video stage, as found for instance in a conventional television receiver. A stage such as V 116 of the television receiver lay-out RCA 630-TS, as disclosed in page 278 of the above mentioned "Television Simplified" is suitable.

Receiver 34 (Fig. 11) includes preceding stages of the television receiver.

III. The third element is a diode clipper as shown by Fig. 9.2 page 227 of "Television Simplified" or a triode clipper as shown by Fig. 9.5 biased inversely to the preceding one and transmitting only positive synchro pulses. These pulses are fed to the telemeasurement device 36—37—38—39—40.

The three stages mentioned in I, II and III are connected to point 5 of the V 116 stage of the above mentioned lay-out, owing to an impedance adaptation of the preceding V 115 stage.

The stations could be both fixed or both movable, one of them, in this last case, moving for instance at a lower speed than the other (airplane carrier and aircraft based thereon).

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. In combination, a radio television transmitting station, a radio television receiving station, means at said receiving station for transmitting television synchronizing pulses, means at said transmitting station for receiving said pulses, means at said transmitting station for transmitting video signals and simultaneously retransmitting said synchronizing pulses, means at said receiving station for receiving said video signals and said retransmitted pulses, means at said receiving station responsive to reception of said retransmitted pulses for synchronizing said television receiving station with said television transmitting station, and a device other than said television communication system and including means operative in response to said synchronizing pulses.

2. In combination, a radio television receiving station, a radio television transmitting station movable with respect to said receiving station, means at said receiving station for transmitting television synchronizing pulses, means at said transmitting station for receiving said pulses, means at said transmitting station for transmitting video signals and simultaneously retransmitting said synchronizing pulses, means at said receiving station for receiving said video signals and said retransmitted pulses, means at said receiving station responsive to reception of said retransmitted pulses for synchronizing said television receiving station with said television transmitting station, and means at said receiving station operative in response to both the outgoing pulses transmitted therefrom and the incoming retransmitted pulses received thereby for localizing said transmitting station.

3. In combination, a radio television receiving station, a radio television transmitting station movable with respect to said receiving station, means at said receiving station for transmitting television synchronizing pulses, means at said transmitting station for receiving said pulses, means at said transmitting station for transmitting video signals and simultaneously retransmitting said synchronizing pulses, means at said receiving station for receiving said video signals and said retransmitted pulses, means at said receiving station responsive to reception of said retransmitted pulses for synchronizing said television receiving station with said television transmitting station, and means at said receiving station operative in response to both the outgoing pulses transmitted therefrom and the incoming retransmitted pulses received thereby for localizing said transmitting station with respect to said receiving station.

4. In a combination, a radio television receiving station, a radio television transmitting station movable with respect to said receiving station, means at said receiving station for transmitting television synchronizing pulses, means at said transmitting station for receiving said pulses, means at said transmitting station for transmitting video signals and simultaneously retransmitting said synchronizing pulses, means at said receiving station for receiving said video signals and said retransmitted pulses, means at said receiving station responsive to reception of said retransmitted pulses for synchronizing said television receiving station with said television transmitting station, and means at said receiving station operative in response to both the outgoing pulses transmitted therefrom and the incoming retransmitted pulses received thereby for measuring the distance from said transmitting station to said receiving station.

5. In combination, a radio television receiving station, a radio television transmitting station mounted on an aircraft, means at said receiving station for transmitting television synchronizing pulses, means at said transmitting station for receiving said pulses, means at said transmitting station for transmitting video signals and simultaneously retransmitting said synchronizing pulses, means at said receiving station for receiving said video signals and said retransmitted pulses, means at said receiving station responsive to reception of said retransmitted pulses for synchronizing said television receiving station with said television transmitting station, and means at said receiving station operative in response to both the outgoing pulses transmitted therefrom and the incoming retransmitted pulses received thereby for measuring the altitude of said aircraft above the ground.

6. In combination, a radio television receiving station, a radio television transmitting station movable with respect to said receiving station, means at said receiving station for transmitting television synchronizing pulses, means at said transmitting station for receiving said pulses, means at said transmitting station for transmitting video signals and simultaneously retransmitting said synchronizing pulses, means at said receiving station for receiving said video signals and said retransmitted pulses, means at said receiving station responsive to reception of said retransmitted pulses for synchronizing said television receiving station with said television transmitting station, and an oscillograph at said receiving station for indicating the time interval between the emission of an outgoing pulse transmitted therefrom and the reception at the same station of the same pulse retransmitted thereto for localizing said transmitting station.

7. A combination according to claim 6 further including means for particularizing every $n$th pulse transmitted from said receiving station.

8. In combination, a radio television receiving station, a radio television transmitting station mounted on an aircraft, a television screen at said receiving station, means at said receiving station for transmitting line synchronizing pulses, means at said transmitting station for receiving said pulses, means at said transmitting station for transmitting video signals and simultaneously retransmitting said synchronizing pulses toward said receiving station, means at said receiving station responsive to reception of said retransmitted pulses for synchronizing said television receiving station with said television transmitting station, means at said transmitting station for retransmitting vertically toward the ground said synchronizing pulses, receiving these pulses reflected from the ground, and retransmitting them toward said receiving station, and means for marking on said television screen the reception of the signals retransmitted after reflection from the ground.

9. In combination, a radio television transmitting station, a radio television receiving station, means at said receiving station for transmitting television synchronizing pulses, means at said transmitting station for receiving said pulses, means at said transmitting station for transmitting video signals and simultaneously retransmitting said synchronizing pulses toward said receiving station, means at said receiving station for receiving said video signals and said retransmitted pulses, means at said receiving station responsive to reception of said retransmitted pulses for synchronizing said television receiving station with said television transmitting station, means at at least one of said stations for modulating the pulses transmitted therefrom by means of signals, means at the other of said stations for detecting said signals from the received modulated pulses, and receiving means at said last mentioned station operative in response to these detected signals.

10. In combination, a radio television transmitting station, a radio television receiving station, means at said receiving station for transmitting television synchronizing pulses, means at said transmitting station for receiving said pulses, means at said transmitting station for transmitting video signals and simultaneously retransmitting said synchronizing pulses toward said receiving station, means at said receiving station for receiving said video signals and said retransmitted pulses, means at said receiving station responsive to reception of said retransmitted pulses for synchronizing said television receiving station with said television transmitting station, means at said receiving station for modulating the pulses transmitted therefrom by means of telecontrol signals, means at said transmitting station for detecting said signals from the received modulated pulses, and receiving telecontrol means at said last mentioned station operative in response to these detected signals.

11. In combination, a radio television transmitting station, a radio television receiving station, means at said receiving station for transmitting television synchronizing pulses, means at said transmitting station for receiving said pulses, means at said transmitting station for transmitting video signals from simultaneously retransmitting said synchronizing pulses toward said receiving station, means at said receiving station for receiving said video signals and said retransmitted pulses, means at said receiving station responsive to reception of said retransmitted pulses synchronizing said television receiving station with said television transmitting station, a measurement apparatus at said transmitting station, means at said last mentioned station for modulating the pulses retransmitted therefrom by means of signals responsive to the indication of said apparatus, means at said receiving station for detecting said signals from the received modulated pulses, and indicating means at said last mentioned station operative in response to these detected signals.

12. A combination according to claim 1 in which said receiving station is in fixed position and said transmitting station is on board a vehicle including instruments, said transmitting station including an iconoscope and means for projecting upon a portion of said iconoscope an image of said instruments.

HENRI GEORGES DE FRANCE.

References Cited in the file of this patent

UNITED STATES PATENTS

| Number | Name | Date |
|---|---|---|
| 2,027,530 | Hammond | Jan. 14, 1936 |
| 2,070,651 | Domsett | Feb. 16, 1937 |
| 2,150,551 | Kemp | Mar. 14, 1939 |
| 2,195,103 | Urtel | Mar. 26, 1940 |
| 2,227,045 | Urtel | Dec. 31, 1940 |
| 2,262,942 | Jones | Nov. 18, 1941 |
| 2,278,788 | Kinck | Apr. 7, 1942 |
| 2,284,873 | Kemp | June 2, 1942 |
| 2,298,476 | Goldsmith | Oct. 13, 1942 |
| 2,329,339 | De Baun | Sept. 14, 1943 |
| 2,401,441 | Tolson et al. | June 4, 1946 |
| 2,421,017 | Deloraine | May 27, 1947 |

FOREIGN PATENTS

| Number | Country | Date |
|---|---|---|
| 224,235 | Switzerland | Feb. 1, 1943 |
| 402,121 | Great Britain | Nov. 27, 1933 |

OTHER REFERENCES

RCA Review, Dec. 1947, pages 612 to 632.

RCA Review, Dec. 1946, pages 601 to 621.

"Television," by Wilson, 1937, pages 334, 335, 351.